US008780887B2

(12) United States Patent
Kim et al.

(10) Patent No.: US 8,780,887 B2
(45) Date of Patent: Jul. 15, 2014

(54) METHOD OF NETWORK-BASED COMMUNICATION IN VIRTUAL NETWORK ENVIRONMENT

(75) Inventors: Sun Cheul Kim, Daejeon (KR); Seong Moon, Daejeon (KR); Seungwoo Hong, Daejeon (KR); Ho Sun Yoon, Daejeon (KR); Ho Yong Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 194 days.

(21) Appl. No.: 13/234,425

(22) Filed: Sep. 16, 2011

(65) Prior Publication Data

US 2012/0106559 A1    May 3, 2012

(30) Foreign Application Priority Data

Oct. 29, 2010    (KR) .................. 10-2010-0107107

(51) Int. Cl.
*H04L 12/28* (2006.01)
*H04L 29/06* (2006.01)
(52) U.S. Cl.
CPC .................................. *H04L 63/029* (2013.01)
USPC ......................................................... 370/351
(58) Field of Classification Search
CPC ..................... H04L 63/0272; H04L 63/029
USPC .................. 370/351, 389, 392, 395.3, 422;
709/227, 230–232, 238–242, 244
See application file for complete search history.

(56) References Cited

U.S. PATENT DOCUMENTS

| 7,237,260 | B2* | 6/2007 | Yu et al. ........................... 726/11 |
| 7,609,701 | B2* | 10/2009 | Yang et al. ............... 370/395.52 |
| 7,843,918 | B2* | 11/2010 | Osborne ........................ 370/389 |
| 8,014,421 | B2* | 9/2011 | Rao et al. ....................... 370/470 |
| 8,296,437 | B2* | 10/2012 | Pankratov ..................... 709/227 |
| 2006/0130136 | A1* | 6/2006 | Devarapalli et al. ............ 726/15 |
| 2007/0174436 | A1* | 7/2007 | Maekawa et al. ............. 709/223 |
| 2008/0307519 | A1* | 12/2008 | Curcio et al. ................... 726/15 |
| 2010/0235481 | A1* | 9/2010 | Deutsch et al. ............... 709/222 |
| 2011/0082941 | A1 | 4/2011 | Kim et al. |

FOREIGN PATENT DOCUMENTS

KR    1020080059900 A    7/2008

OTHER PUBLICATIONS

B. Ford, Peer-to-Peer communication across network address translators, MIT Lab, Feb. 17, 2005, pp. 1-14.*

P. Srisuresh, State of P2P communication across NATs, RFC 5128, RFC, Mar. 2008, pp. 1-32.*

* cited by examiner

*Primary Examiner* — Dmitry H Levitan (57) ABSTRACT

In a plurality of virtual tunnel routers including a first virtual tunnel router and a second virtual tunnel router, the first virtual tunnel router and the second virtual tunnel router request virtual network prefix information from a tunnel mapping controller. When the tunnel mapping controller generates virtual network prefix information of the first virtual tunnel router and the second virtual tunnel router, respectively, and transmits the same along with information of a list of adjacent virtual tunnel routers, the first virtual tunnel router and the second virtual tunnel router create a tunnel. With the tunnel established, the virtual network prefix information received by the first virtual tunnel router and second virtual tunnel router, respectively, is linked so that direct communication can be performed between the first virtual tunnel router and the second virtual tunnel router.

10 Claims, 9 Drawing Sheets

METHOD OF NETWORK-BASED COMMUNICATION IN VIRTUAL NETWORK ENVIRONMENT

CROSS-REFERENCE TO RELATED APPLICATION

This application claims priority to and the benefit of Korean Patent Application No. 10-2010-0107107 filed in the Korean Intellectual Property Office on Oct. 29, 2010, the entire contents of which are incorporated herein by reference.

BACKGROUND OF THE INVENTION (a) Field of the Invention

The present invention relates to a method of network-based communication in a virtual network environment.

(b) Description of the Related Art

An Internet protocol (IP) network uses a firewall or network address translation (NAT) in order to block external access or due to a shortage of IPs. In this environment, the communication market is striving to apply peer-to-peer (P2P) technology into services for games, messengers, etc.

An IP network including a NAT or firewall provides direct communication of P2P L4 (Layer 4) level with help from a server.

For P2P direct communication, each terminal needs to determine its own network connection type. If a terminal is connected to a public network, the terminal needs to detect the presence of a firewall. Otherwise, if the terminal is connected to a network using an NAT, the terminal needs to determine the type of the NAT. When no firewall exists, this is called Open. Examples of NAT types include Full Cone, Restricted Cone, Port Restricted Cone, and Symmetric.

Table 1 shows the possibility of direct communication between a receiver and a sender without help from a server in a conventional IP network. In Table 1, "Open" refers to being open, and "Firewall" refers to a firewall.

TABLE 1

| Sender \ Receiver | | Public | | NAT | | | |
|---|---|---|---|---|---|---|---|
| | | Open | Firewall | Full Cone | Restricted Cone | Port Restricted Cone | Symmetric |
| Public | Open | ○ | ○ | ○ | ○ | ○ | ○ |
| Public | Firewall | X | X | X | X | X | X |
| NAT | Full Cone | X | X | X | X | X | X |
| NAT | Restricted Cone | X | X | X | X | X | X |
| NAT | Port Restricted Cone | X | X | X | X | X | X |
| NAT | Symmetric | X | X | X | X | X | X |

As shown in Table 1, if the receiver is in an open public network (Public-Open), direct communication between the sender and the receiver is possible.

However, if an NAT or firewall is incorporated, the sender and the receiver have to obtain a changed IP and port information of the opposing terminal with help from the server to perform communication.

Table 2 shows the possibility of direct communication between the receiver and the sender when changed IP and port information of the opposing terminal is obtained from the server.

TABLE 2

| Sender \ Receiver | | Public | | NAT | | | |
|---|---|---|---|---|---|---|---|
| | | Open | Firewall | Full Cone | Restricted Cone | Port Restricted Cone | Symmetric |
| Public | Open | ○ | ○ | ○ | ○ | ○ | ○ |
| Public | Firewall | X | X | X | X | X | X |
| NAT | Full Cone | ○ | ○ | ○ | ○ | ○ | ○ |
| NAT | Restricted Cone | X | X | X | X | X | X |
| NAT | Port Restricted Cone | X | X | X | X | X | X |
| NAT | Symmetric | X | X | X | X | X | X |

In Table 2, even if the receiver and the sender have obtained changed IP and port information of the opposing terminal with help from the server, direct communication between the sender and the receiver is possible only when the receiver is in an open public network (Public-Open) and uses Full Cone NAT (Nat-Full Cone).

Moreover, either TCP or UDP punching is done for direct communication between the sender and the receiver. Table 3 shows the possibility of direct communication between the receiver and the sender after hole punching is done using the changed IP and port information of the opposing terminal from the server. In Table 3, ▲ indicates that, when either the sender or the receiver uses symmetric NAT (NAT-Symmetric), direct communication is possible only when the IP is not changed but only the port is changed, and direct communication is impossible if the other node uses restricted cone NAT (NAT-Restricted Cone) even when the IP is changed.

TABLE 3

| Sender \ Receiver | | Public | | NAT | | | |
|---|---|---|---|---|---|---|---|
| | | Open | Firewall | Full Cone | Restricted Cone | Port Restricted Cone | Symmetric |
| Public | Open | ○ | ○ | ○ | ○ | ○ | ○ |
| Public | Firewall | ○ | ○ | ○ | ○ | ○ | X |
| NAT | Full Cone | ○ | ○ | ○ | ○ | ○ | ○ |
| NAT | Restricted Cone | ○ | ○ | ○ | ○ | ○ | ▲ |
| NAT | Port Restricted Cone | ○ | ○ | ○ | ○ | ○ | X |
| NAT | Symmetric | ○ | X | ○ | ▲ | X | X |

As shown in Table 3, even if hole punching is done, direct communication between the sender and the receiver is not always possible for all types of connections between the sender and the receiver.

That is, it is clear that direct communication is impossible between symmetric NAT (NAT-Symmetric) and symmetric NAT (NAT-Symmetric), between symmetric NAT (NAT-Symmetric) and a common network with a firewall (Public-Firewall), and between symmetric NAT (NAT-Symmetric) and port restricted cone NAT (NAT-Port Restricted Cone).

However, in this case as well, direct communication can be made possible using TURN (Traversal Using Relay NAT).

TURN enables direct communication via a device connected to an open public network (Public-Open). That is, the sender and the receiver respectively transmit data to the device connected to the open public network (Public-Open) for communication with the opposing terminal, and this device enables direct communication by modifying the packets and transmitting the data to the opposing terminal.

In this way, the method of enabling direct communication between the sender and the receiver has to be performed for each service, i.e., each L4 (Layer 4) session. Thus, when one terminal runs multiple sessions for direct communication, a handling procedure has to be frequently repeated. Such a direct communication method is a technology that is applied only to P2P. Therefore, a virtualized networking environment capable of Virtual IP (VIP)-based direct communication and a virtual network connection method for network-based movement are required.

That is, there are some cases where a direct communication environment is not provided between terminals because the terminals are connected to an NAT or firewall in most cases in an Internet consisting of routers in the prior art. Accordingly, most of the current Internet services are being provided in a web-based way or in a centralized way.

Further, although the internet with the feature of an open architecture has to be able to provide various communication services between terminals, as well as centralized services, there are many restrictions due to an NAT/firewall incorporated in the current Internet architecture. Moreover, in the conventional internet architecture, a new IP is assigned to a network each time a terminal is connected to the Internet. It is difficult to provide mobility to the terminal since the assigned IP always changes in each network. Subsequently, there is a need for a method of supporting mobility in a virtual network environment that introduces a new ID concept.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of network-based communication in a virtual network environment capable of direction communication based on a virtual address.

An exemplary embodiment of the present invention provides a communication method that provides end-to-end communication in a virtual network environment, the method including:

a plurality of virtual tunnel routers including a first virtual tunnel router and a second virtual tunnel router receiving a message containing virtual network prefix information from a tunnel mapping controller; determining whether the first virtual tunnel router has received a hole punching message from the second virtual tunnel router; if the first virtual tunnel router has received a hole punching message, the first virtual tunnel router establishing a tunnel with the second virtual tunnel router based on the virtual network prefix information; and the first virtual tunnel router performing direct communication with the second virtual tunnel router through the established tunnel.

Another exemplary embodiment of the present invention provides a communication method that provides end-to-end communication in a virtual network environment, the method including:

a tunnel mapping controller receiving a registration request message from a plurality of virtual tunnel routers; checking whether information of the virtual tunnel router having transmitted the registration request message is pre-stored; if the information of the virtual tunnel router is not stored, registering the information of the virtual tunnel router contained in the registration request message; receiving a request from the virtual tunnel router to provide virtual network prefix information; and creating a virtual network prefix for the virtual tunnel router having requested the virtual network prefix information and transmitting the same to enable direct communication between the virtual tunnel routers.

Still another exemplary embodiment of the present invention provides a communication method that enables direct communication between a plurality of virtual tunnel routers including a first virtual tunnel router and a second virtual tunnel router by working in conjunction with a tunnel mapping controller, the method including:

the first virtual tunnel router and the second virtual tunnel router requesting virtual network prefix information from the tunnel mapping controller; the tunnel mapping controller generating virtual network prefix information of the first virtual tunnel router and second virtual tunnel router, respectively, and transmitting the same along with information of a list of adjacent virtual tunnel routers: the first virtual tunnel router and the second virtual tunnel router creating a tunnel; and performing direct communication between the first virtual tunnel router and the second virtual tunnel router by linking the virtual network prefix information received by the first virtual tunnel router and the second virtual tunnel router, respectively.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In this specification, a terminal (UE) may designate a mobile station (MS), a mobile terminal (MT), a subscriber station (SS), a portable subscriber station (PSS), user equipment (UE), an access terminal (AT), etc., and may include the entire or partial functions of the mobile terminal, the subscriber station, the portable subscriber station, the user equipment, etc.

In this specification, a base station (BS) may designate an access point (AP), a radio access station (RAS), a Node B, a base transceiver station (BTS), a mobile multihop relay (MMR)-BS, etc., and may include the entire or partial functions of the access point, the radio access station, the node B, the base transceiver station, the MMR-BS, etc.

Hereinafter, a method of supporting network-based mobility in a virtual network environment according to an exemplary embodiment of the present invention will be described with reference to the accompanying drawings.

Figure 1:
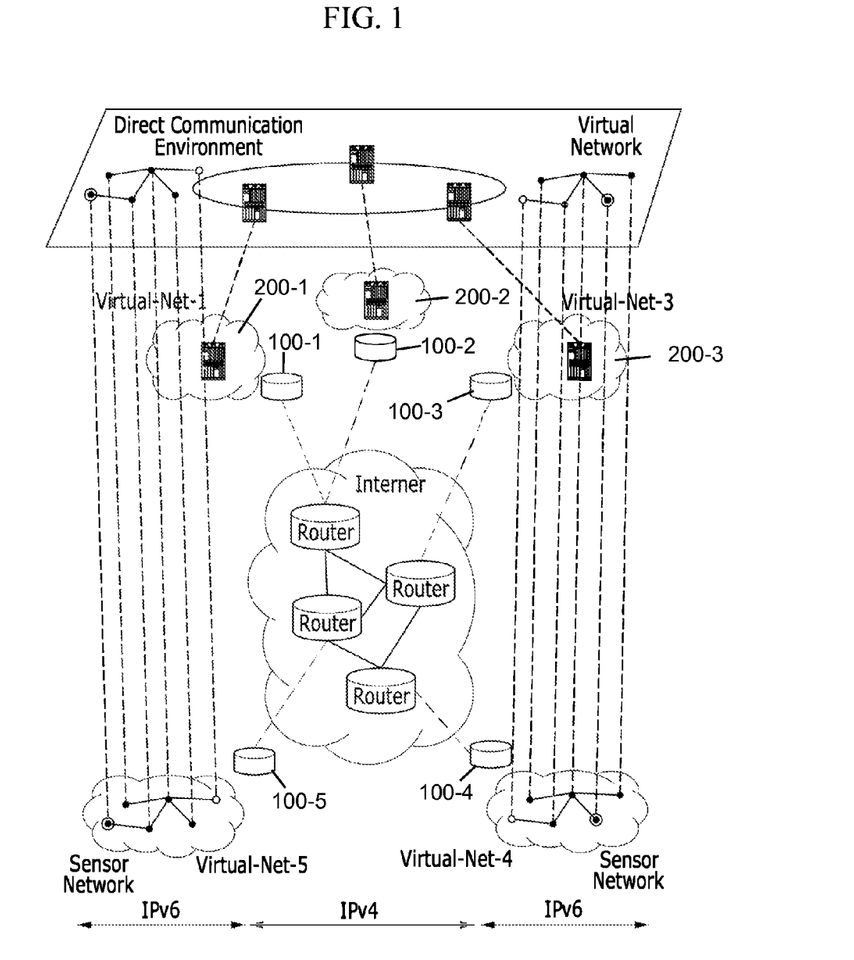
FIG. 1 is an illustration of a virtualized network according to an exemplary embodiment of the present invention.

FIG. 1 is an illustration of a virtualized network according to an exemplary embodiment of the present invention.

As shown in FIG. 1, a virtualized network providing a direct communication environment based on a virtual IP includes virtual tunnel routers (hereinafter, "virtual TR") 100-1 to 100-5. The virtual TRs 100-1 to 100-5 may be connected to a conventional general router, and may be connected to a switch, ethernet port, or radio signal network (e.g., WiFi, WiMax, 3G network, etc.) to which a terminal is connected. Moreover, they may be connected to a network with an NAT or firewall incorporated therein.

The virtual TRs 100-1 to 100-5 operate as network components which form one or more virtual networks 200-1 to 200-3. An IP-UDP/TCP-IP tunnel (hereinafter referred to as "IP tunnel") is established between the virtual TRs 100-1 to 100-5. Then, by exchanging information of a virtual network prefix of each virtual network between the virtual TRs, a terminal located on each virtual network may be in direct communication with a terminal on a virtual network at a remote location connected via the Internet.

In the exemplary embodiment of the present invention, a virtual IP is an IP address used in the inner header of an IP tunnel, which will be described taking an IPv4 or IPv6 address as an example. A virtual IP has the meaning as an unchangeable identifier on the virtualized network, like identifying respective virtual networks and identifying terminals located in a virtual network area.

Although both an IPv4 network and an IPv6 network currently exist on the Internet, it is considerably difficult to link the two different networks, and such a linking operation is rare. In the exemplary embodiment of the present invention, a virtual IP and a network IP are used separately, and both IPv4 and IPv6 can be used as the virtual IP. Therefore, a consistent and systematical virtualized network can be generated by introducing the concept of virtual TRs and a virtual network in the conventional internet, which is divided by region and uses a different IP structure for each region.

A network structure for supporting mobility by configuring such a virtualized network will be described with reference to FIG. 2.

Figure 2:
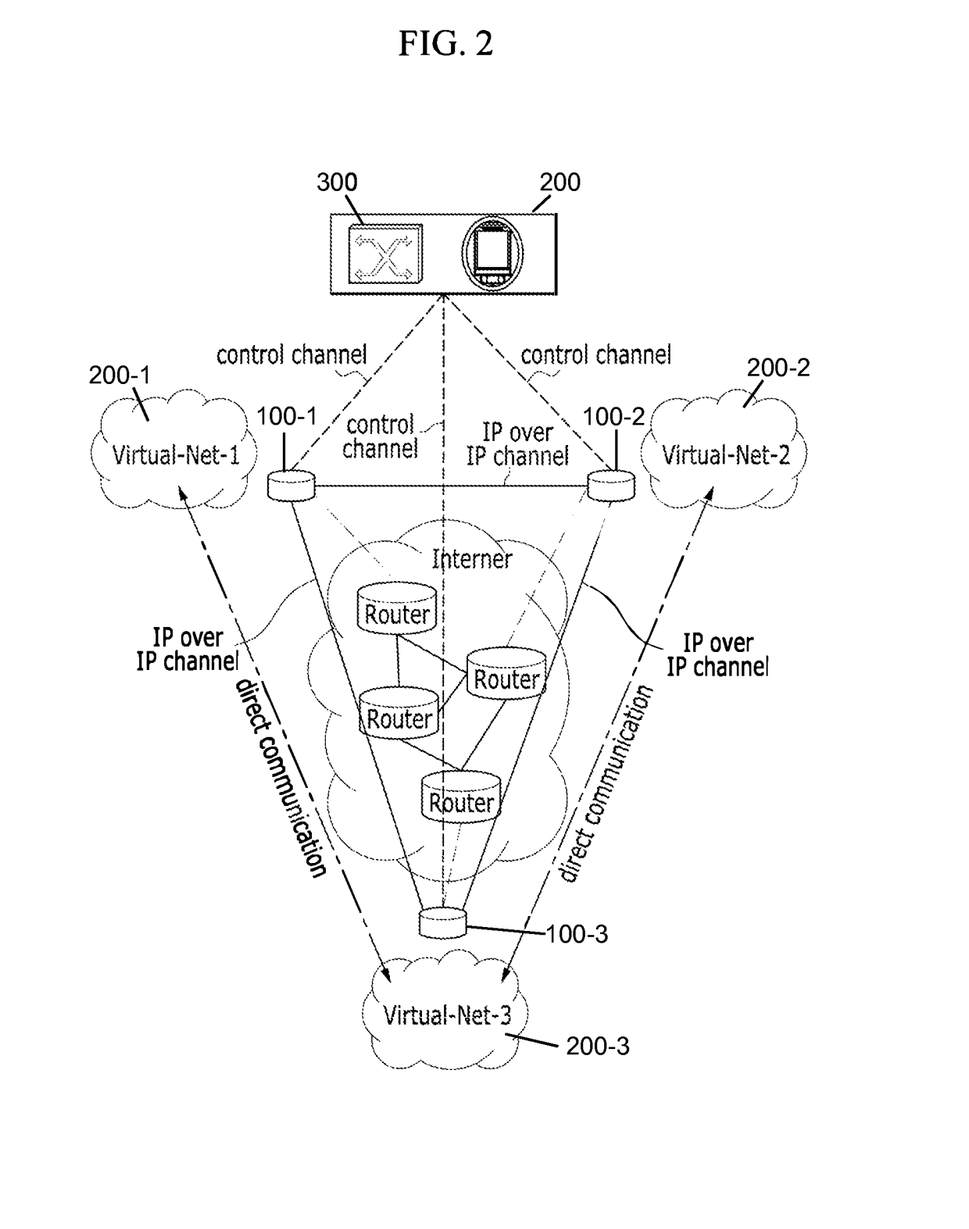
FIG. 2 is a view showing a structure of the virtualized network according to an exemplary embodiment of the present invention.

FIG. 2 is a view showing a structure of the virtualized network according to an exemplary embodiment of the present invention.

As shown in FIG. 2, the virtualized network includes a tunnel mapping controller 200 and a tunnel relay 300 located on the network so that the virtual TRs 100-1 to 100-3 located outside the network can communicate with each other.

The tunnel mapping controller 200 serves to process and control tunneling between a plurality of virtual TRs and various signaling messages. That is, the tunnel mapping controller 200 establishes an IP tunnel in conjunction with each of the virtual TRs 100-1 to 100-3, and connects each virtual IP prefix to the established tunnel, thus enabling direct communication between virtual networks.

To this end, the tunnel mapping controller 200 includes a virtual network prefix information table. When the virtual TRs 100-1 to 100-3 request virtual network prefix information after registering themselves, the tunnel mapping controller 200 allocates and forwards virtual network prefixes to the virtual TRs 100-1 to 100-3, respectively.

The tunnel relay 300 performs tunneling at the center in case no tunnel is established between the virtual TRs, and performs the function of forwarding tunneled data. When the virtual TRs 100-1 to 100-3 are connected to the internet, they may be connected to a public network or an NAT, or a firewall may be incorporated.

Accordingly, the tunnel relay 300 establishes a tunnel of the virtual TRs 100-1 to 100-3 if it is impossible to establish a tunnel between the virtual TRs 100-1 to 100-3. The tunnel relay 300 may be included in a component such as the tunnel mapping controller 200, or included in a different component at a physically different location.

As such, a direct communication environment may be provided to terminals in the network area among a first virtual network 200-1, a second virtual network 200-2, and a third virtual network 200-3 through the tunnel mapping controller 200 and the tunnel relay 300. A procedure of managing and assigning virtual network prefixes in order to support network-based mobility in this structure will be described with reference to FIG. 3. Prior to the description, an explanation will be given in the exemplary embodiment of the present invention by taking an example of two virtual networks (first virtual network and second virtual network) and two virtual TRs 100-1 and 100-2 for convenience of description.

Figure 3:
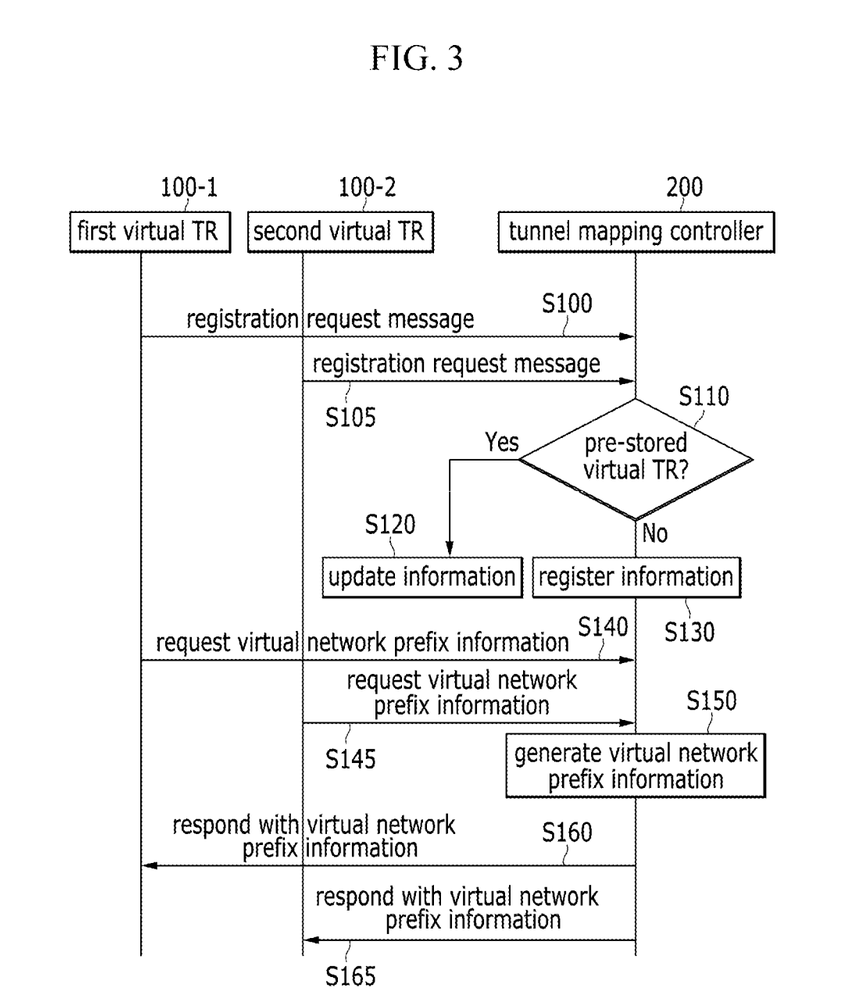
FIG. 3 is a flowchart showing a method of managing and assigning virtual network prefixes according to an exemplary embodiment of the present invention.

FIG. 3 is a flowchart showing a method of managing and assigning virtual network prefixes according to an exemplary embodiment of the present invention.

Virtual network prefix information is addresses assigned to terminals or devices connected to respective virtual networks. For example, if a virtual network has a prefix and length of 1.1.1.0/24, each terminal connected to the virtual network is assigned one IP in the range from 1.1.1.1 to 1.1.1.255, which is virtual network prefix information. Although an example will be given in which this information is generated by the tunnel mapping controller 200, provided to the virtual TRs 100-1 and 100-2, and then stored in a database referred to by the tunnel mapping controller 200 at a point of time when each of the virtual TRs 100-1 and 100-2 is registered in the tunnel mapping controller 200, this information may be predetermined by an administrator and assigned to the virtual TRs 100-1 and 100-2.

In the method in which the virtual TRs 100-1 and 100-2 each constituting a virtual network manage and assign virtual network prefix information in conjunction with the tunnel mapping controller 200, as shown in FIG. 3, the first virtual TR 100-1 of a first virtual network and the second virtual TR 100-2 of a second virtual network each transmit a registration request message in order to perform registration to the tunnel mapping controller 200 (S100 and S105).

When configuring a virtual network by a pre-planned method to configure multiple virtual networks, the process of registering each virtual TR in the tunnel mapping controller may be manually set and used. Otherwise, the registration process may be performed by running a server such as a portal site. Accordingly, in the process of registration through portal or the like, the registration request message contains ID information and password information assigned or determined in the registration process.

That is, supposing that, in the registration through portal, the ID is "Virtual-Net-1" and the password is "2345", the corresponding information is stored in a specific database (DB). At this point, the tunnel mapping controller 200 is able to search the corresponding DB. Thus, when performing an authentication procedure required for a virtual TR to connect to the tunnel mapping controller 200 in order to configure a virtual network later, information for identifying the virtual TR, such as the corresponding ID "Virtual-Net-1" and the password "12345", is checked, and stored only when the virtual TR is a proper virtual TR.

As described above, when the first virtual TR 100-1 and the second virtual TR 100-2 perform registration to the tunnel mapping controller 200, the registration is performed through the web or other various methods, and the registration method is not limited to a specific one.

When the tunnel mapping controller 200 receives a registration request message from the virtual TRs 100-1 and 100-2, it determines whether the corresponding virtual TRs 100-1 and 100-2 having transmitted the registration request message are virtual TRs pre-stored in the database (S110). If they are existing stored virtual TRs, they are updated and managed with the information contained in the registration request message (S120), and if they are new virtual TRs, the information contained in the registration request message is newly registered (S130).

When the first virtual TR 100-1 and the second virtual TR 100-2 are registered in the tunnel mapping controller 200 by this procedure, the virtual TRs request virtual network prefix information to be used by themselves from the tunnel mapping controller 200 (S140 and S145). The tunnel mapping controller 200 generates virtual network prefix information to be provided to the first virtual TR 100-1 and the second virtual TR 100-2 (S150), and then provides it to a virtual TR having requested the virtual network prefix information (S160 and S165). The virtual network prefix information supports both IPv4 and IPv6, and contains information such as network prefix, length, and network type.

In the process of registering the virtual TRs in the tunnel mapping controller 200 in step S130, an NAT traversal function or a Session Traversal Utilities for NAT (STUN) procedure is performed together to learn the incorporation of an NAT/firewall. The information learned through this procedure is used as information such as mapped IP/port and network connection type or network operation mode to be JO used later in a virtual TR tunneling process. The NAT traversal function or STUN procedure is a well-known technology, so a detailed description thereof will be omitted in the exemplary embodiment of the present invention.

A tunneling procedure to be performed after the virtual TRs are assigned virtual network prefixes through the aforementioned procedure will be described with reference to FIG. 4.

Figure 4:
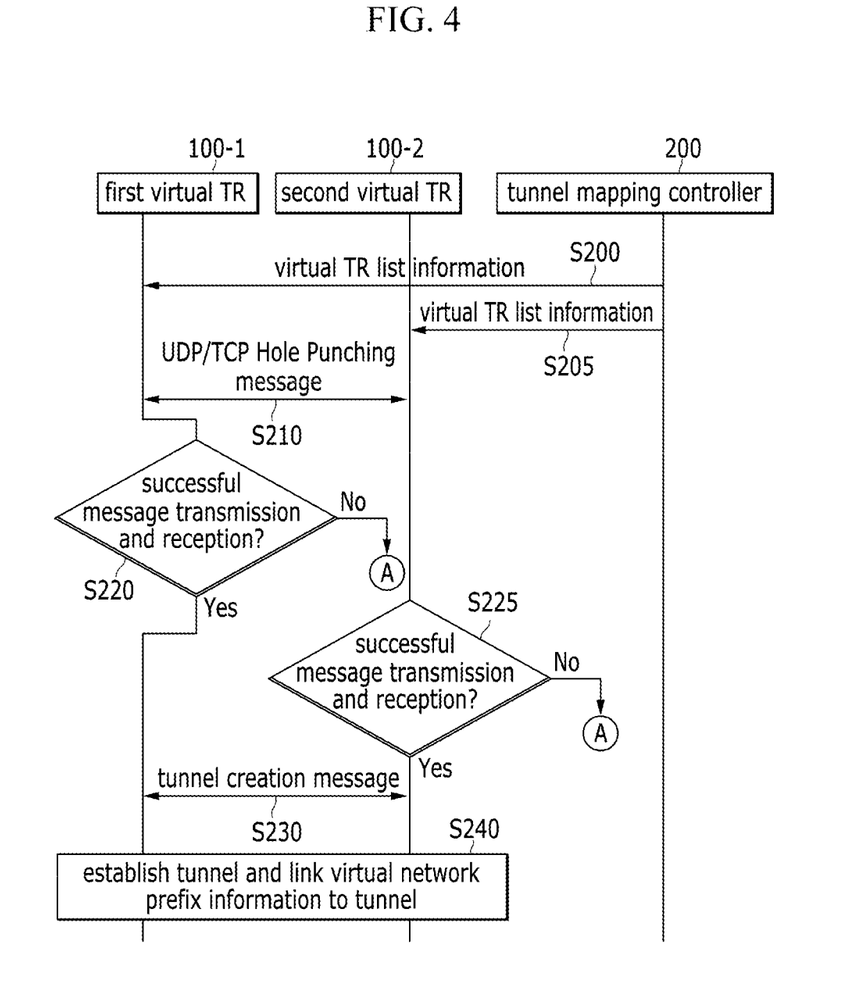
FIG. 4 is a flowchart showing a tunneling procedure of virtual TRs according to an exemplary embodiment of the present invention.

FIG. 4 is a flowchart showing a tunneling procedure of virtual TRs according to an exemplary embodiment of the present invention.

As shown in FIG. 4, when the first virtual TR 100-1 and the second virtual TR 100-2 are connected to the virtualized network, the tunnel mapping controller 200 creates information of a list of virtual TRs for tunneling and reports it in order to notify that the currently registered first virtual TR 100-1 and second virtual TR 100-2 are targets to be configured into the virtual network, i.e., to be tunneled for direct communication (S200 to S205). That is, the first virtual TR 100-1 is notified that it requires tunneling with the second virtual TR, and the second virtual TR 100-2 is informed that it requires tunneling with the first virtual TR.

The information of a list of virtual TRs for tunneling contains information such as the mapped IP/port, network connection type, and operation mode of a connected network. This is to notify of information to be referred to for an STUN or UDP/TCP Hole Punching in the tunneling process because each virtual TR may be located in an NAT or firewall.

When each virtual TR receives the information of a list of virtual TRs for tunneling, a hole punching message for UDP/TCP Hole Punching is exchanged in order to establish a tunnel with the virtual TR (S210). Then, each virtual TR determines whether the transmission and reception of the hole punching message are successful (S220 and S225). If the message transmission and reception are successful, a tunnel establishment message is exchanged (S230).

When a tunnel is established between the first virtual TR 100-1 and the second virtual TR 100-2 through this procedure, virtual network prefix information of the opposing virtual network is linked to the tunnel (S240). Then, a direct communication environment is constructed between the first virtual TR 100-1 and the second virtual TR 100-2. That is, a first virtual network with a virtual IP of 1.1.1.0/24 can establish direct communication with a second virtual network with a virtual IP of 2.2.2.0/24. The virtual IP may be a private IP or public IP.

On the other hand, if the hole punching message transmission and reception in steps S220 and S225 fail, an environment capable of direct communication is constructed through another tunneling procedure. This will be described with reference to FIG. 5.

Figure 5:
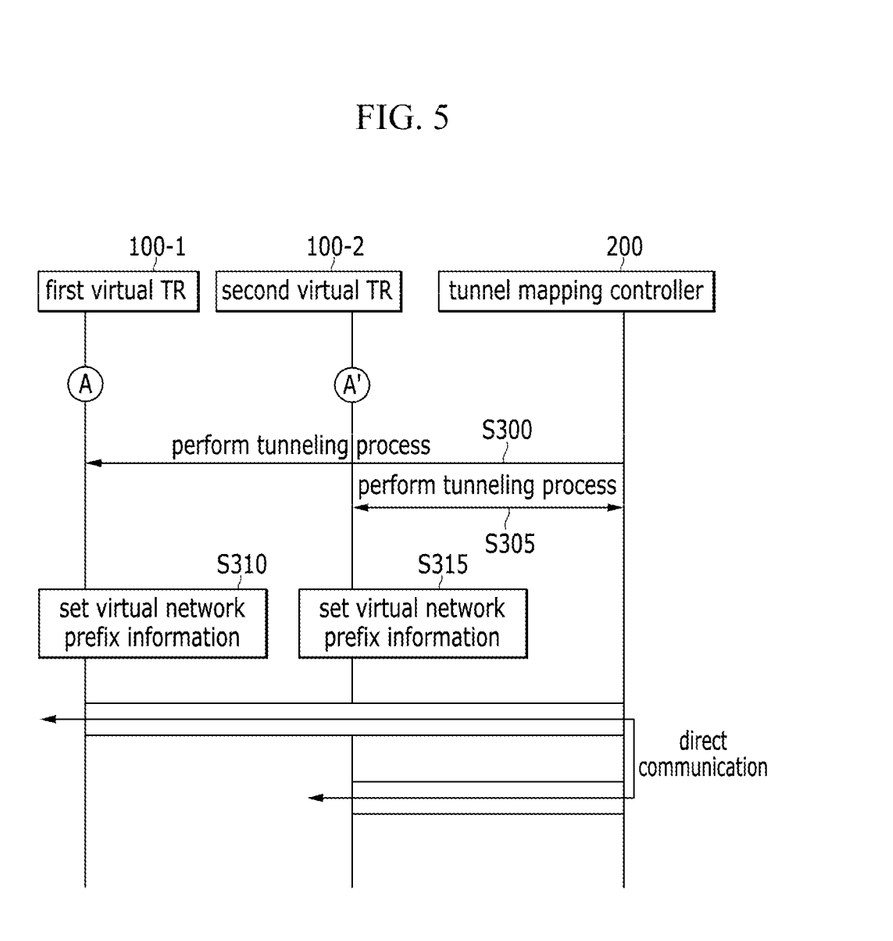
FIG. 5 is a flowchart showing a tunneling procedure through a tunnel relay according to an exemplary embodiment of the present invention.

FIG. 5 is a flowchart showing a tunneling procedure through a tunnel relay according to an exemplary embodiment of the present invention.

If the hole punching message transmission and reception in steps S220 and S225 of FIG. 4 fail, as shown in FIG. 5, the first virtual TR 100-1 and the second virtual TR 100-2 each perform a tunneling process with the tunnel mapping controller 200 in order to establish a tunnel with the tunnel relay 300 located at the center (S300 and S305).

When a tunnel is established between the first virtual TR 100-1 or second virtual TR 100-2 and the tunnel relay 300 through steps S300 and S305, the first virtual TR 100-1 and the second virtual TR 100-2 set the virtual network prefix information of the first virtual network and second virtual network, respectively, to the tunnel via the tunnel relay 300 (S315 and S315), thereby constructing a virtualized network capable of direct communication via the tunnel relay 300.

A method of connecting to a virtualized network if the second virtual TR 100-2 moves from one network to another network when the virtualized network capable of direct communication between the virtual TRs 100-1 and 100-2 or between the virtual TRs 100-1 and 100-2 and the tunnel relay 300 as shown in FIGS. 4 and 5 will be described with reference to FIG. 6. The virtual TRs may be large-scale devices such as routers/switches generally referred to in a network, or small-scale devices such as internet sharers or access points (APs) for WiFi.

Figure 6:
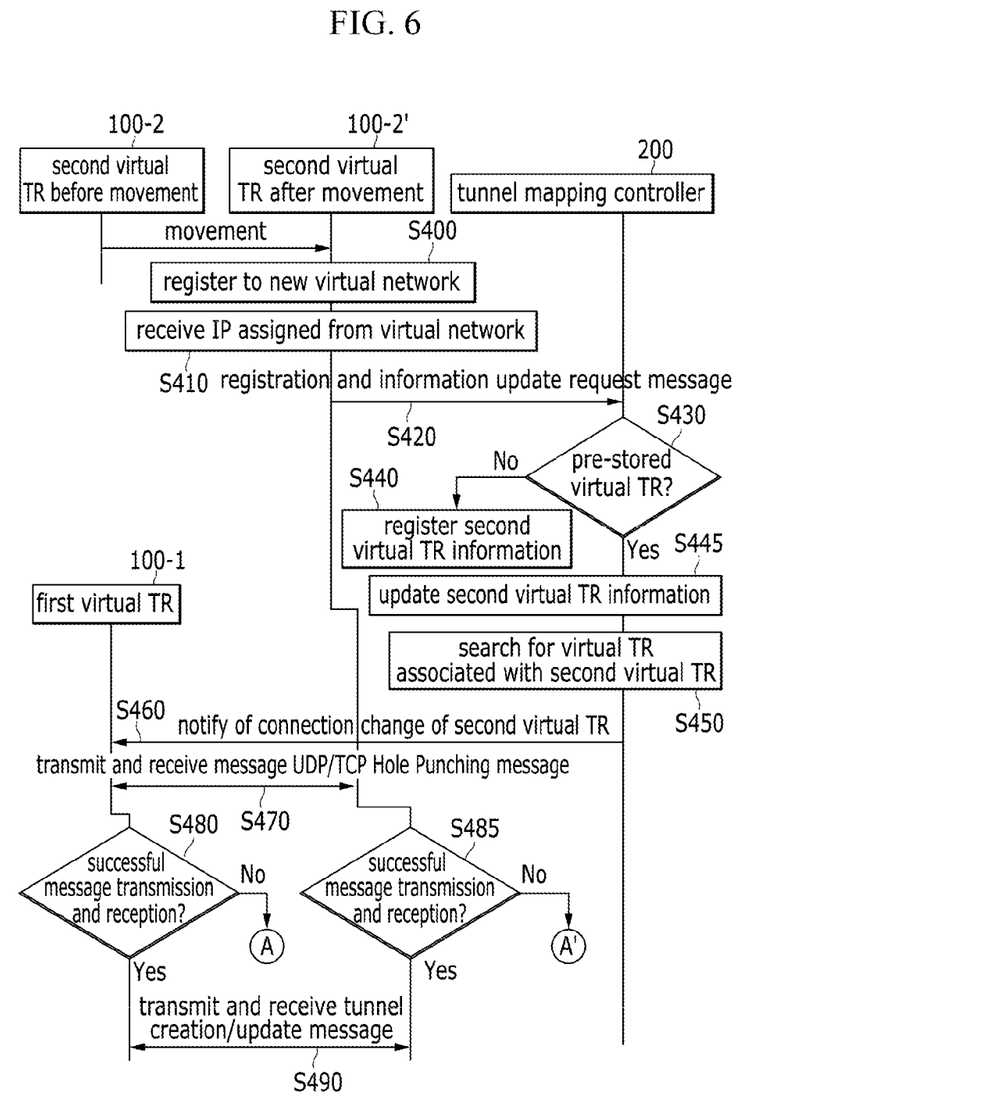
FIG. 6 is a flowchart showing a virtualized network connection procedure after the movement of a virtual TR according to an exemplary embodiment of the present invention.

FIG. 6 is a flowchart showing a virtualized network connection procedure after the movement of a virtual TR according to an exemplary embodiment of the present invention.

When the second virtual TR 100-2 with a source IP/port (SrcIP/port) of y.y.y.y/bbbb and a mapped IP/port of (y.y.y.y) "/(bbbb)" before movement as shown in FIG. 5, whose connection type, operation mode, etc. are registered as values, moves to a new network and performs a registration procedure as shown in FIG. 6 (S400), it receives an IP assigned from a virtual network (S410). It is assumed that the IP assigned and received from the virtual network is a value with an SrcIP/port of Y.Y.Y.Y/BBBB and a mapped IP/port of (Y.Y.Y.Y)"/(BBBB)". The new network connected by the second virtual TR 100-2 may be various networks, such as ethernet and IP-based wireless networks including WiFi, WiMAX, 3G, 4G, etc.

A registration request message containing this value is transmitted to the tunnel mapping controller 200 to perform the registration procedure (S420). The tunnel mapping controller 200 having received the registration request message determines whether information on the second virtual TR is stored (S430). If the information on the second virtual TR is already stored, the tunnel mapping controller 200 confirms that connection information of the second virtual TR 100-2' is changed, and updates it with the information on the second virtual TR contained in the registration request message received in step S420 (S440).

As a result of the determination in step S430, if the second virtual TR is a newly registered virtual TR, the second virtual TR information contained in the registration request message is registered (S445). However, the flow shown in FIG. 6 according to the exemplary embodiment of the present invention is about a network connection procedure executed when a virtual TR moves. It is necessary to establish a new IP tunnel with the first virtual TR 100-1 of the virtualized network configured by a second virtual TR 100-2' and update existing tunnel information.

The tunnel mapping controller 200 having updated the information of the second virtual TR 100-2' searches for a list of virtual TRs associated with the second virtual TR 100-2' among the plurality of stored virtual TRs (S450). Then, the virtual TRs associated with the second virtual TR 100-2' are notified of the connection change of the newly connected second virtual TR 100-2'(S460). Although the exemplary embodiment of the present invention is described taking the first virtual TR 100-1 as an example of a virtual TR associated with the second virtual TR 100-2', the present invention is not necessarily limited thereto.

That is, the information, such as the SrcIP/port, mapped IP/port, connection type, and operation mode of the second virtual TR 100-2' is forwarded to the first virtual TR 100-1. At this point, the tunnel mapping controller 200 may notify the first virtual TR 100-1 of the connection, or the second virtual TR 100-2' whose connection is changed may receive a list of virtual TRs from the tunnel mapping controller 200 and notify the virtual TRs of the connection.

Moreover, the second virtual TR 100-2' may store previous connection information, i.e., information on adjacent virtual TRs, therein, and notify the virtual TRs of the connection based on the stored values. The exemplary embodiment of the present invention will be described taking an example in which the tunnel mapping controller 200 notifies the first virtual TR 100-1 of the connection.

When the first virtual TR 100-1 receives changed information of the first virtual TR 100-1 from the tunnel mapping controller 200, it performs a hole punching message transmission and reception process with the moved second virtual TR 100-2' (S470). Next, each of the virtual TRs checks whether the message transmission and reception are successful (S480 and S485). An IP address for message transmission and reception to perform the S470 step is based on the mapped IP/port contained in the information that the first virtual TR 100-1 received from the tunnel mapping controller 200 in step S460.

Meanwhile, if exact values of the connection type and operation mode are contained in the information notified in step S460, it is determined whether the hole punching message transmission and reception process performed in step S470 either between the virtual TRs or by the tunnel mapping controller 200 can be omitted. If so, the corresponding process can be omitted. As the process of determining whether to omit the hole punching message transmission and reception process is well-known, a detailed description thereof will be omitted in the exemplary embodiment of the present invention.

Afterwards, if the hole punching message transmission and reception process is successful, or a message exchange using the mapped IP/port is always possible, for example, in a public/open relationship, a message exchange process for creating or updating a tunnel between the first virtual TR 100-1 and the second virtual TR 100-2' is performed (S490). At this time, virtual network prefix information as well is exchanged and updated.

However, if the hole punching message transmission and reception process is not successful, an update message is exchanged through the procedure shown in FIG. 5. Further, the procedure is performed not with the second virtual TR 100-2 shown in FIG. 5 but with the moved second virtual TR 100-2'.

An example of the method of transmitting connection change information of the second virtual TR 100-2' to the first virtual TR 100-1 in step S460 of FIG. 6 includes a method in which the second virtual TR 100-2' receives a list from the tunnel mapping controller 200 and then the second virtual TR 100-2' autonomously exchanges an update message with the first virtual TR 100-1 as needed. This will be described with reference to FIG. 7.

Figure 7:
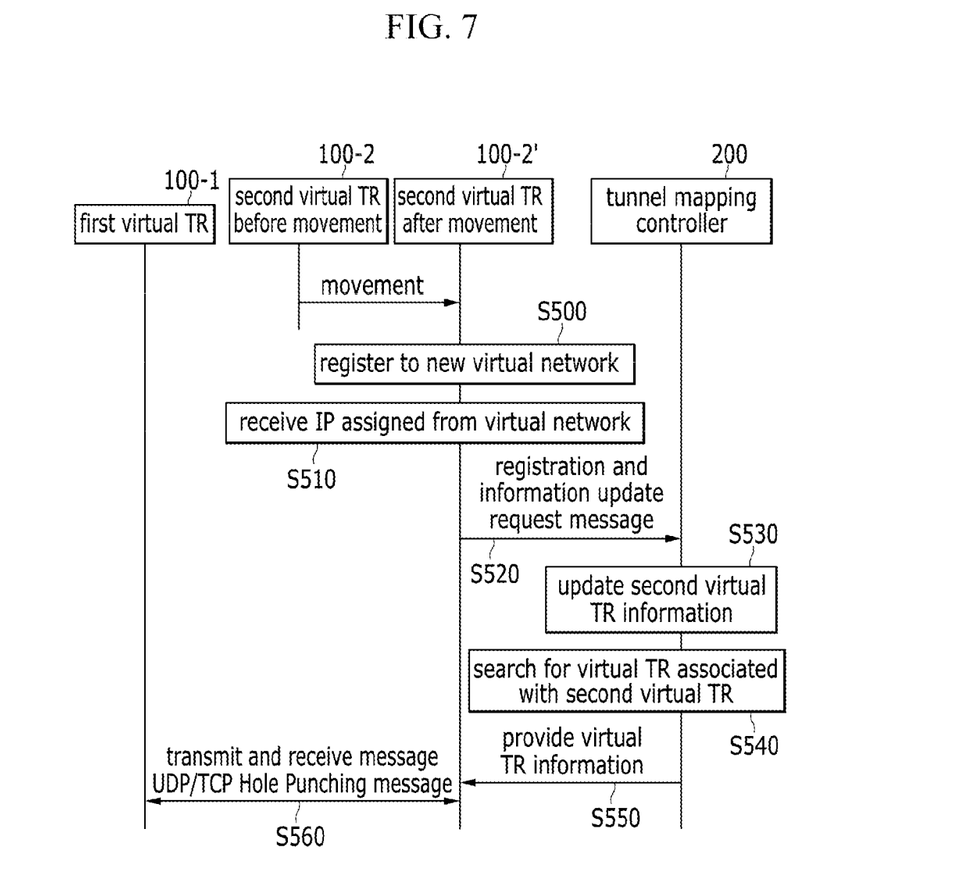
FIG. 7 is a flowchart showing a procedure for notifying a virtual TR of connection change information according to another exemplary embodiment of the present invention.

FIG. 7 is a flowchart showing a procedure for notifying a virtual TR of connection change information according to another exemplary embodiment of the present invention.

As shown in FIG. 7, when the second virtual TR 100-2 moves and is connected and registered to a new network (S500), it is assigned a new IP from the network (S510). After connecting to a new network using the IP assigned in step S510, the moved second virtual TR 100-2' transmits a registration and information update request message to the tunnel mapping controller 200 in order to update its registration and connection information (S520).

The tunnel mapping controller 200 updates the information based on the registration and information update request message transmitted from the moved second virtual TR 100-2' (S530). Although the procedure of step S430 explained in FIG. 6 is performed between steps S520 and S530, this step can be omitted for convenience.

When the tunnel mapping controller 200 updates the information of the moved second virtual TR 100-2' through step S530, information on the first virtual TR 100-1 included in the virtualized network to which the second virtual TR 100-2' is connected is searched for (S540) and transmitted to the second virtual TR 100-2' (S550). The second virtual TR 100-2' having received the first virtual TR 100-1 performs a home punching message transmission and reception process with the first virtual TR 100-1 as needed, and exchanges a message for tunnel creation or update (S560). At this time, virtual network prefix information as well is exchanged and updated. The procedures subsequent to step S560 are consistent with steps S480 to S490 of FIG. 6, so detailed descriptions thereof will be omitted for FIG. 7.

Next, a method of communication between a terminal located inside a virtualized network area and a terminal or server existing outside the virtualized network area will be described with reference to FIGS. 8A and 8B. A virtual IP explained in the exemplary embodiment of the present invention may be a public IP or private IP. Also, the virtual IP may be IPv4 or IPv6.

Figure 8A:
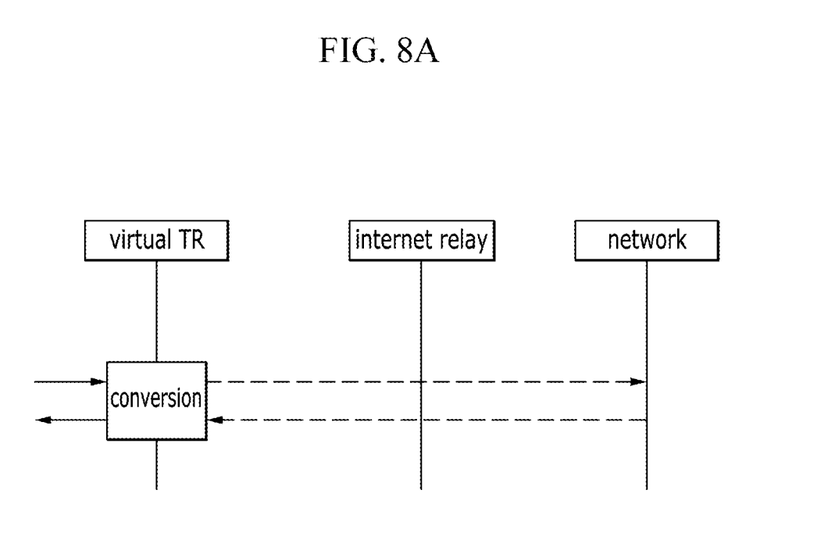
FIGS. 8A and 8B are flowcharts showing a method of communication between a terminal inside a virtualized network and a terminal outside the virtualized network according to an exemplary embodiment of the present invention.
Figure 8B:
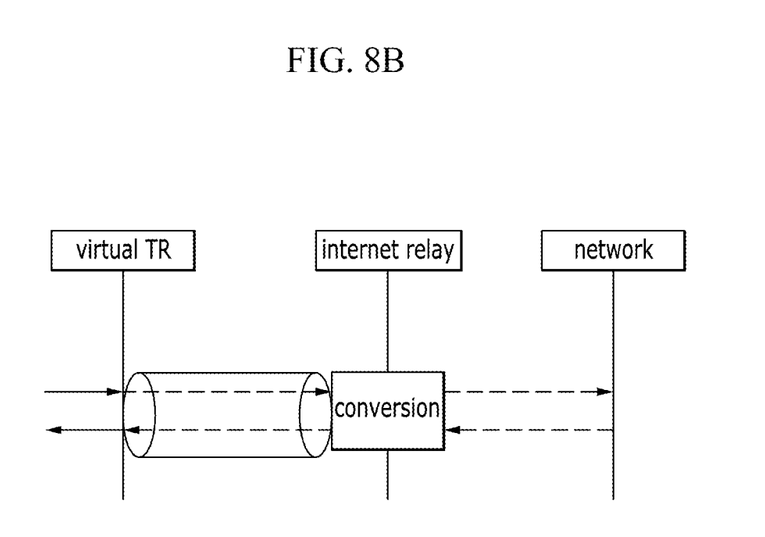

FIGS. 8A and 8B are flowcharts showing a method of communication between a terminal inside a virtualized network and a terminal outside the virtualized network according to an exemplary embodiment of the present invention.

The method of communication from the virtualized network shown in FIGS. 8A and 8B to the Internet corresponds to the case where the virtual IP is actually a private IP. The virtualized network using a private IP is basically blocked from an external network, i.e., the internet. However, when nodes inside the virtualized network require communication to the internet, the communication is performed using the method shown in FIGS. 8A and 8B.

First, as shown in FIG. 8A, a virtual TR converts a network address for the virtual IP of a packet coming from the virtual TR toward the network, i.e., performs an NAT function. Accordingly, a virtual TR basically performs various operations associated with the tunnel mapping controller 200 and the functions of tunneling and virtual network prefix information exchange between associated virtual TRs, and additionally performs the function of NAT on the virtual IP toward the internet.

Meanwhile, as shown in FIG. 8B, when it is necessary to manage and control data transmitted to the internet for a particular purpose, an internet relay in charge of processing packets toward the Internet is included in the virtualized network to perform the NAT function, rather than performing the NAT function by all the virtual TRs.

In this case, the respective virtual TRs establish a tunnel for an internet packet with the Internet relay in order to process data via the internet. Also, to put a packet toward the internet on the established tunnel, a tunnel using an IP packet excluding a virtual network prefix segment established in a virtual network is used.

The Internet relay performs the function of establishing a tunnel from each virtual TR. When a packet received by tunneling is forwarded to the Internet, the outer header and the UDP header are deleted first, and then a network transmission conversion function is performed based on the source IP/port (virtual IP/port) of the inner header. As a concrete method of conversion into NAT is already well-known, a detailed description thereof will be omitted in the exemplary embodiment of the present invention.

According to an exemplary embodiment of the present invention, a large-scale virtualized network capable of direct communication can be constructed, and network-based mobility can be supported.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method that provides end-to-end communication in a virtual network environment, the method comprising:
    a plurality of virtual tunnel routers comprising a first virtual tunnel router and a second virtual tunnel router receiving a message containing virtual network prefix information from a tunnel mapping controller;
    determining whether the first virtual tunnel router has received a hole punching message from the second virtual tunnel router;
    if the first virtual tunnel router has received a hole punching message, the first virtual tunnel router establishing a tunnel with the second virtual tunnel router based on the virtual network prefix information; and
    the first virtual tunnel router performing direct communication with the second virtual tunnel router through the established tunnel.

2. The method of claim 1, wherein the receiving of a message comprises:
    the first virtual tunnel router transmitting a registration request message to the tunnel mapping controller; and
    if the first virtual tunnel router is a virtual router not registered in the tunnel mapping controller, the first virtual tunnel router receiving a response message containing virtual network prefix information created from the first virtual tunnel router from the tunnel mapping controller.

3. The method of claim 2, comprising:
    if the first virtual tunnel router is a pre-stored virtual tunnel router and the first virtual tunnel router has moved, receiving an IP from a new virtual network to which the first virtual tunnel router has moved and registered;
    the first virtual tunnel router connecting to the new virtual network using the received IP;
    the first virtual tunnel router connected to the new virtual network, transmitting a registration and information update request message to the tunnel mapping controller; and
    performing a tunnel creation procedure with virtual tunnel routers adjacent to the first virtual tunnel router.

4. The method of claim 3, wherein the performing of the tunnel creation procedure comprises the first virtual tunnel router connected to the new virtual network receiving adjacent virtual tunnel router information from the tunnel mapping controller.

5. The method of claim 1, comprising:
    if the first virtual tunnel router has not received a hole punching message from the second virtual tunnel router, the first virtual tunnel router performing a tunneling process with the tunnel mapping controller; and
    when a tunnel is established between the first virtual tunnel router and the tunnel mapping controller, the first virtual tunnel router connecting the received virtual network prefix information to the tunnel.

6. A communication method that enables direct communication between a plurality of virtual tunnel routers including a first virtual tunnel router and a second virtual tunnel router by working in conjunction with a tunnel mapping controller, the method comprising:
    the first virtual tunnel router and the second virtual tunnel router requesting virtual network prefix information from the tunnel mapping controller;
    the tunnel mapping controller generating virtual network prefix information of the first virtual tunnel router and second virtual tunnel router, respectively, and transmitting the same along with information of a list of virtual tunnel routers for which previous connection information has been stored;

the first virtual tunnel router and the second virtual tunnel router creating a tunnel; and performing direct communication between the first virtual tunnel router and the second virtual tunnel router by linking the virtual network prefix information received by the first virtual tunnel router and the second virtual tunnel router, respectively.

7. The method of claim 6, comprising:

before requesting for the virtual prefix information, the first virtual tunnel router and the second virtual tunnel router transmitting a registration request message to the tunnel mapping controller;

the tunnel mapping controller determining whether the first and second virtual tunnel routers are pre-stored virtual tunnel routers based on the transmitted registration request message; and if the first and second virtual tunnel routers are not pre-stored virtual tunnel routers, the tunnel mapping controller storing information contained in the registration request message and registering the first virtual tunnel router and the second virtual tunnel router.

8. The method of claim 6, wherein the creating of a tunnel comprises:

the first virtual tunnel router and the second virtual tunnel router transmitting and receiving a hole punching message based on the information of a list of virtual tunnel routers;

determining whether the transmission and reception of the hole punching message between the first virtual tunnel router and the second virtual tunnel router are successful;

if anyone of the virtual tunnel routers fails in the transmission and reception of the hole punching message, the first virtual tunnel router and the second virtual tunnel router each establishing a tunnel with the tunnel mapping controller; and the first virtual tunnel router and the second virtual tunnel router each linking the received virtual network prefix information to the established tunnel.

9. The method of claim 6, comprising:

when the second virtual tunnel router moves after the performing of direct communication, registering the second virtual tunnel router to a virtual network to which the second virtual tunnel router has moved, and receiving an IP from the virtual network;

the second virtual tunnel router transmitting a registration/information update request message containing the received IP to the tunnel mapping controller;

the tunnel mapping controller updating the information of the second virtual tunnel router with the virtual tunnel router information contained in the registration/information update request message;

the tunnel mapping controller searching for an adjacent virtual tunnel router having a tunnel established with the second virtual tunnel router; and the tunnel mapping controller transmitting the updated virtual tunnel router information to the searched adjacent virtual tunnel router.

10. The method of claim 9, comprising, after the transmitting of the updated virtual tunnel router information, creating a tunnel between the second virtual tunnel router and the adjacent virtual tunnel router.

* * * * *